US008073178B2

(12) United States Patent
Tsao et al.

(10) Patent No.: US 8,073,178 B2
(45) Date of Patent: *Dec. 6, 2011

(54) MICROPHONE

(75) Inventors: Ching-Jung Tsao, Shalu Township, Taichung County (TW); I-Ming Lin, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 1285 days.

This patent is subject to a terminal disclaimer.

(21) Appl. No.: 11/693,109

(22) Filed: Mar. 29, 2007

(65) Prior Publication Data

US 2008/0240470 A1 Oct. 2, 2008

(51) Int. Cl.
*H04R 9/08* (2006.01)
*H04R 25/00* (2006.01)
*H04M 1/00* (2006.01)

(52) U.S. Cl. ...................... 381/355; 381/375; 455/575.1

(58) Field of Classification Search .................. 381/355, 381/375, 361, 365; 455/575.1, 569.1, 575.3, 455/575.4; 379/433.01, 433.03, 433.13, 379/388.02, 420.03

See application file for complete search history.

(56) References Cited

U.S. PATENT DOCUMENTS 3,707,607 A * 12/1972 Reddick .......................... 379/37
3,800,089 A * 3/1974 Reddick ........................ 379/453

* cited by examiner

*Primary Examiner* — Curtis Kuntz
*Assistant Examiner* — Sunita Joshi
(74) *Attorney, Agent, or Firm* — Muncy, Geissler, Olds & Lowe, PLLC

(57) ABSTRACT

A microphone includes a casing having an open side and a lid mounted to and covering the open side of the casing. A circuit board and a mounting plate are mounted in the casing. An audio conversion unit and a switch are mounted on the circuit board and electrically connected with each other such that activation of the switch controls on/off of the audio conversion unit. The lid includes a pivotal portion pivotably engaged with an end of the mounting plate distant to the switch, allowing the other end of the lid to pivot relative to the mounting plate between an activating position for pressing against and activating the switch and a non-activating position disengaged from the switch. A returning member is mounted between the lid and the casing for returning the other end of the lid to the non-activating position.

16 Claims, 4 Drawing Sheets

MICROPHONE

BACKGROUND OF THE INVENTION

The present invention relates to a microphone and, more particularly to a handfree microphone for mobile phones.

Mobile phones provide people with convenient communication through direct conversation and messages. When not using an earphone, a user has to hold the mobile phone to one of his or her ears, leading to hazards if the user is driving. Thus, many countries outlaw use of mobile phones without earphones during driving. Handfree microphones have been proposed. A typical design includes an earphone having a microphone that is located adjacent to a user's mouth when the earphone is placed in an ear of the user. The microphone includes a case consisting of an upper casing and a lower casing. A circuit board is mounted in the case and includes an audio conversion device and a switch for controlling on/off of the audio conversion device. The upper casing includes a sound hole aligned with the audio conversion device for receiving sound. Also mounted on the upper casing is a push button that can be pressed to activate the switch. However, it takes some time for a driver to grope the push button when his or her mobile phone rings, which may cause problems to the driver whose both hands are on a steering device such as a steering wheel or handgrips. For safety consideration, the driver usually gropes and presses the push button when he or she feels no danger. However, the driver might miss the phone call.

It is, therefore, a need in a handfree microphone that allows easy operation even during driving.

BRIEF SUMMARY OF THE INVENTION

The present invention solves this need and other problems in the field of handfree microphones by providing, in a preferred form, a microphone including a casing having an open side and a lid mounted to and covering the open side of the casing. A circuit board and a mounting plate are mounted in the casing. An audio conversion unit and a switch are mounted on the circuit board and electrically connected with each other such that activation of the switch controls on/off of the audio conversion unit. The lid includes a pivotal portion pivotably engaged with an end of the mounting plate distant to the switch, allowing the other end of the lid to pivot relative to the mounting plate between an activating position for pressing against and activating the switch and a non-activating position disengaged from the switch. A returning member is mounted between the lid and the casing for returning the other end of the lid to the non-activating position.

In the most preferred form, the end of the mounting plate includes a seat that includes two sidewalls each having a pivot hole. The lid includes two lugs pivotably received in the seat. Each lug includes a pin protruding from a side thereof and pivotally engaged in one of the pivot holes of the sidewalls of the seat.

In the preferred form, the returning member includes a body extending through a hole in the casing. The body includes a wire hole adapted to be extended through by a wire electrically connected to the circuit board. The returning member further includes a resilient portion extending from the body and abutting against the lid. In the most preferred form, the body includes an enlarged section inside the casing and having a dimension greater than a diameter of the hole of the casing. The resilient portion is in the form of a resilient tooth projecting from the enlarged section.

In the preferred form, the lid includes a first sound hole aligned with the audio conversion unit. A resilient member is mounted between the audio conversion unit and the lid. The resilient member includes a compressible first end having a second sound hole aligned with the audio conversion unit and in communication with the first sound hole. The resilient member further includes a second end securely mounted around the audio conversion unit. In the most preferred form, the compressible first end of the resilient member includes an annular groove in an outer periphery thereof. The second sound hole of the resilient member includes an inner conic section with increasing diameter toward the audio conversion unit and an outer conic section with increasing diameter away from the audio conversion unit. The mounting plate includes a through-hole in which the audio conversion unit and the second end of the resilient member are received. The lid includes an inner face with a recessed portion surrounding the first sound hole. An air-permeable dustproof sheet is received in the recessed portion and sandwiched between the compressible first end of the resilient member and the lid.

In the preferred form, the mounting plate further includes an opening in which the switch is received. The other end of the lid includes a projection extending from an inner face thereof and into the opening of the mounting plate. The projection of the lid presses against and activates the switch when the lid is pressed in an area distant to the pivotal portion. In the most preferred form, the opening of the mounting plate includes a coupling portion. The lid includes a hook extending from an inner face thereof and through the opening and engaged with a side of the coupling portion distant to the inner face of the lid. The mounting plate includes four pegs respectively extending downward from four corners thereof, and the casing includes four holes respectively in four corners thereof for receiving the pegs of the mounting plate.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
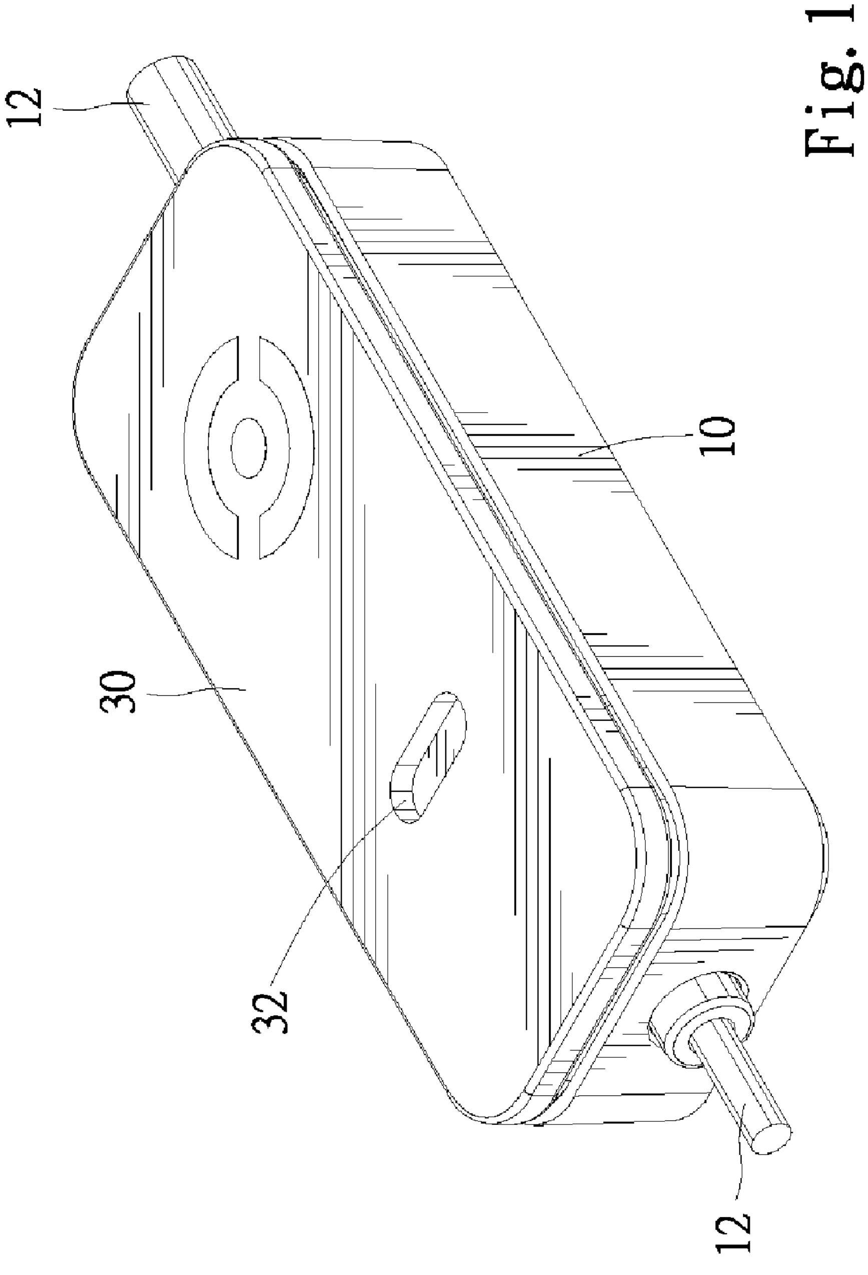
FIG. 1 shows a perspective view of a microphone according to the preferred embodiment of the present invention.
Figure 2:
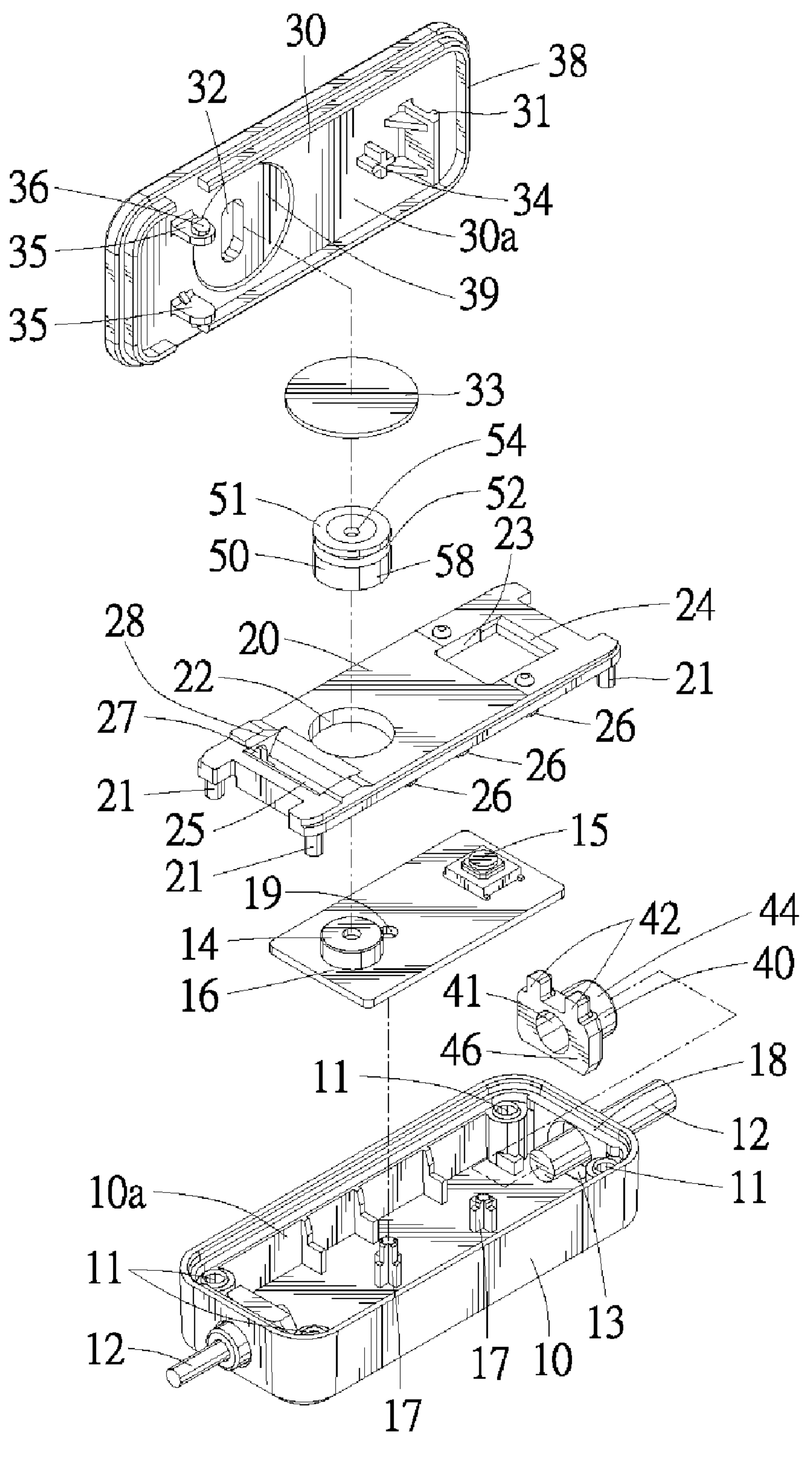
FIG. 2 shows an exploded perspective view of the microphone according to the preferred embodiment of the present invention.

A microphone according to the preferred embodiment of the present invention is shown in the drawings and includes a casing 10 with an opening 10*a* in an open side thereof and a lid 30 mounted to the side of the casing 10 for covering the opening 10*a*. In a preferred form, the casing 10 is rectangular in section and includes a fixing portion 11 in each of four corners thereof. In the most preferred form shown, each fixing portion 11 is in the form of a post having a hole. The casing 10 further includes a wire hole 13 in each of two ends thereof, allowing a wire 12 to extend through the wire hole 13. The casing 10 further includes a groove 18 extending along at least a portion of a perimeter of the open side with the opening 10*a*.

The casing 10 may further include an engaging portion 17 on an inner face of a bottom thereof. In the preferred form shown, the engaging portion 17 is in the form of two protrusions.

A circuit board 16 is mounted in the casing 10 and engages with the engaging portion 17. In the preferred form shown, the circuit board 16 includes through-holes 19 through which the protrusions of the casing 10 extend. Other arrangements for positioning the circuit board 16 in the casing 10 would be within the skill of the art. An audio conversion unit 14 and a switch 15 are mounted on the circuit board 16. The circuit board 16 is in electrical connection with the wires 12, and the switch 15 is electrically connected to the audio conversion unit 14 such that activation of the switch 15 controls on/off of the audio conversion unit 14, which are within the skill of the art.

A mounting plate 20 is mounted in the casing 10 and above the circuit board 16. In the most preferred form shown, the mounting plate 20 is substantially rectangular in section and includes four pegs 21 respectively extending downward from four corners thereof and extending into the respective holes of the respective fixing portions 11 of the casing 10. Other arrangements for positioning the mounting plate 20 in the casing 10 would be within the skill of the art. In the preferred form shown, the mounting plate 20 includes a slot or through-hole 22 for partially receiving the audio conversion unit 14. It can be appreciated that the switch 15 may be located outside, completely received in, or extend beyond the through-hole 22. The mounting plate 20 further includes a slot or opening 23 for partially receiving the switch 15. It can be appreciated that the audio conversion unit 14 may be located outside, completely received in, or extend beyond the opening 23. The opening 23 includes a coupling portion 24 in an edge thereof. The mounting plate 20 further includes a seat 25 in an end thereof distant to the opening 23. In the most preferred form shown, the seat 25 is in the form of a groove including two sidewalls 28 each having a pivot hole 27. The mounting plate 20 may further include a plurality of supports 26 extending downward from a bottom side thereof and abutting against the circuit board 16, thereby securely retaining the circuit board 16 in place. It is noted that the mounting plate 20 does not cover the groove 18 of the casing 10.

In the preferred form shown, the lid 30 is rectangular in section and has a pivotal portion in pivotal connection with the mounting plate 20. In the most preferred form shown, the lid 30 includes a pair of lugs 35 projecting downward from an end of an inner face **30*a* thereof distant to the switch 15. The lugs 35 are pivotably received in the seat 25 of the mounting plate 20 and each include a pin 36 protruding from a side thereof and pivotally engaged in one of the pivot holes 27, allowing the lid 30 to pivot about a pivot axis defined by the pins 36. The lid 30 covers the opening 10*a* of the casing 10 and in the form of a panel. In the preferred form shown, the lid 30 includes a sound hole 32 aligned with the audio conversion unit 14, allowing the audio conversion unit 14 to receive sound waves via the sound hole 32. A recessed portion 39 is defined in the inner face 30*a* of the lid 30 and surrounds the sound hole 32. An air-permeable dustproof sheet 33 is mounted in the recessed portion 39 of the lid 30 to avoid entrance of dusts into the casing 10. The lid 30 further includes a ledge 38 extending from the inner face 30*a* and slideably received in the groove 18 of the casing 10. This allows pivotal movement of the lid 30 when the other end of the lid 30 is pressed. A hook 31 extends from the inner face 30*a* of the lid 30 and through the opening 23 of the mounting plate 23 and engages with an inner side of the coupling portion 24 distant to the inner face 30*a* of the lid 30. This avoids undesired disengagement of the lid 30 from the mounting plate 20 without affecting pivotal movement of the lid 30 about the pivot axis. The lid 30 further includes a projection 34 on the inner face 30*a* thereof. When the other end of the lid 30 is pressed to pivot toward the casing 10 about the pivot axis, the projection 34 presses against and activates the switch 15 and hence turns of/off the audio conversion unit 14**.

A returning member 40 is mounted in the casing 10 for returning the lid 30. In the preferred form shown, the returning member 40 includes a body 44 extending through one of the wire holes 13 and including a hole 41 through which the wire 12 in the wire hole 13 extends. The body 44 includes an enlarged portion 46 on a periphery of an end thereof inside the casing 10 and having a dimension greater than a diameter of the wire hole 12. This avoids the returning member 40 from falling out of the casing 10. The returning member 40 further includes a resilient portion 42 abutting against the inner face **30*a* of the lid 30. In the most preferred form shown, the resilient portion 42 is in the form of two resilient teeth extending from the enlarged portion 46 through the opening 23 of the mounting plate 20 and abutting against the inner face 30*a* of the lid 30. Fewer or a greater number of resilient teeth or other forms of the resilient portion 42 can be utilized, which would be within the skill of the art. Thus, when the other end of the lid 30 is pressed and then released, the projection 34 of the lid 30 is returned to its initial position disengaged from the switch 15 under the action of the resilient portion 42 of the returning member 40**.

The microphone according to the preferred embodiment of the present invention may further include a resilient member 50 for assisting in returning of the lid 30. In the preferred form shown, the resilient member 50 is mounted between the audio conversion unit 14 and the lid 30. The resilient member 50 includes a compressible first end 51 having a sound hole 54 therein in communication with the sound hole 32 of the lid 30. The resilient member 50 further includes a second end 58 securely mounted around the audio conversion unit 14 and received in the through-hole 22 of the mounting plate 20. In the most preferred form shown, the sound hole 54 includes an inner conic section 56 with increasing diameter toward the audio conversion unit 14 and an outer conic section 59 with decreasing diameter away from the audio conversion unit 14. The sound hole 54 of this shape enhances the sound wave receiving effect of the audio conversion unit 14. The air-permeable dustproof sheet 33 is sandwiched between the compressible first end of the resilient member 50 and a bottom wall of the recessed portion 39 of the lid 30 and, thus, positioned in the recessed portion 39 of the lid 30. In the most preferred form shown, the compressible first end 51 of the resilient member 50 includes an annular groove 52 in an outer periphery thereof to provide the required resiliency. Nevertheless, other forms of the compressible first end 51 of the resilient member 50 would be within the skill of the art.

Figure 3:
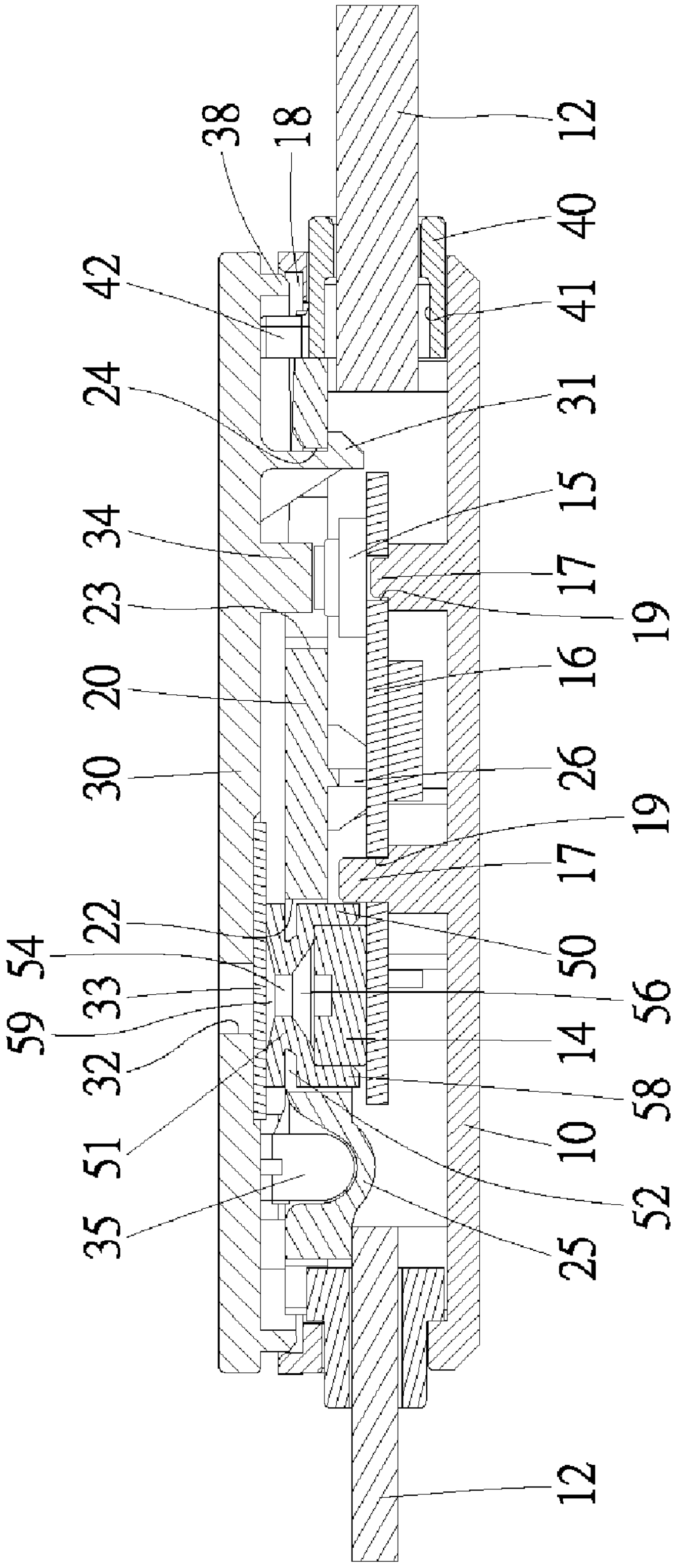
FIG. 3 shows a sectional view of the microphone according to the preferred embodiment of the present invention.
Figure 4:
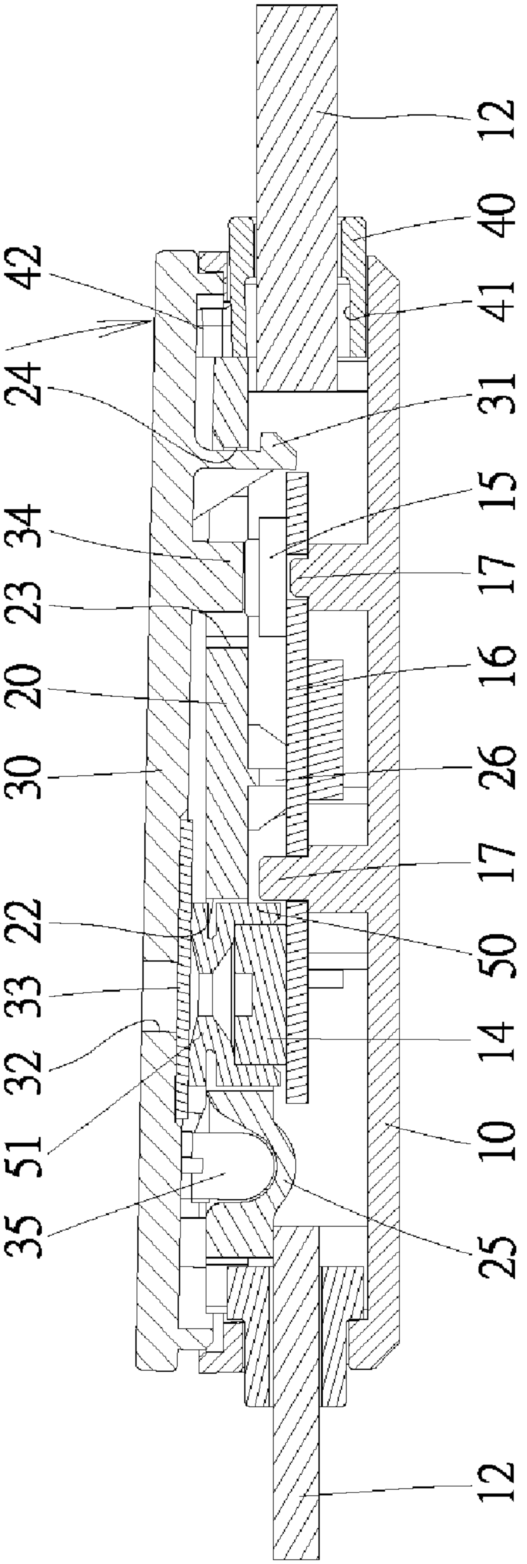
FIG. 4 is a sectional view similar to FIG. 3, illustrating operation of the microphone according to the preferred embodiment of the present invention.

Now that the basic construction of the microphone according to the preferred embodiment of the present invention has been explained, the operation and some of the advantages of the microphone can be set forth and appreciated. When the audio conversion unit 14 is to be activated for receiving sound waves such as in a case that a mobile phone of a user rings, the user presses the lid 30 and hence compresses the returning member 40 and the resilient member 50. The other end of the lid 30 pivots about the pivot axis to an activating position to activate the switch 15 and hence turns on the audio conversion unit 14, whereas the ledge 38 of the lid 30 moves downward in the groove 18 of the casing 10, as illustrated in FIG. 4. Since the lid 30 covers the open side of the casing 10 and has a large area, pressing any section of the lid 30 in an area outside the pivot axis will cause pivotal movement of the lid 30 to activate the audio conversion unit 14. After the pressing force is released, the lid 30 is returned to its initial non-activating position shown in FIG. 3 under the action of the returning member 40 and the resilient member 50. Another pressing of the lid 30 turns off the audio conversion unit 14, which is within the skill of the art.

The microphone according to the preferred embodiment of the present invention allows easy and safe operation without troublesome groping encountered with the prior art microphones. The returning member 40 may be modified from a currently available soft wire jacket without significantly increasing the costs for manufacturing and assembling. Furthermore, the microphone according to the preferred embodiment of the present invention is a compact design with a low profile.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A microphone, comprising:

a casing comprising an open side and a hole;

a circuit board mounted in the casing, with an audio conversion unit being mounted on the circuit board, with a switch being mounted on the circuit board and electrically connected to the audio conversion unit such that activation of the switch controls on/off of the audio conversion unit;

a mounting plate securely mounted in the casing and including an end distant to the switch;

a lid mounted to and covering the open side of the casing, with the lid including a pivotal portion pivotably engaged with the end of the mounting plate, allowing another end of the lid to pivot relative to the mounting plate between an activating position for pressing against and activating the switch and a non-activating position disengaged from the switch; and a returning member mounted between the lid and the casing for returning the other end of the lid to the non-activating position, wherein the returning member comprises a body extending through the hole of the casing, with the returning member further including a resilient portion extending from the body and abutting against the lid, with the body including a wire hole adapted to be extended through by a wire electrically connected to the circuit board.

2. The microphone as claimed in claim 1, with the end of the mounting plate including a seat, with the seat including two sidewalls each having a pivot hole, with the lid including two lugs pivotably received in the seat, and with each said lug including a pin protruding from a side thereof and pivotally engaged in one of the pivot holes of the sidewalls of the seat.

3. The microphone as claimed in claim 1, with the body including an enlarged section inside the casing and having a dimension greater than a diameter of the hole of the casing, and with the resilient portion being a resilient tooth projecting from the enlarged section.

4. The microphone as claimed in claim 1, with the lid including a first sound hole aligned, with the microphone further comprising a resilient member mounted between the audio conversion unit and the lid, with the resilient member including a compressible first end having a second sound hole aligned with the audio conversion unit and in communication with the first sound hole, and with the resilient member further including a second end securely mounted around the audio conversion unit.

5. The microphone as claimed in claim 4, with the compressible first end of the resilient member including an annular groove in an outer periphery thereof, with the second sound hole of the resilient member including an inner conic section with increasing diameter toward the audio conversion unit and an outer conic section with increasing diameter away from the audio conversion unit.

6. The microphone as claimed in claim 5, with the mounting plate including a through-hole in which the audio conversion unit and the second end of the resilient member are received, with the microphone further comprising an air-permeable dustproof sheet received in a recessed portion and sandwiched between the compressible first end of the resilient member and the lid.

7. The microphone as claimed in claim 6, with the lid including an inner face with the recessed portion surrounding the first sound hole.

8. The microphone as claimed in claim 1, with the mounting plate further including an opening in which the switch is received, with the other end of the lid including a projection extending from an inner face thereof and into the opening of the mounting plate, and with the projection of the lid pressing against and activating the switch when the lid is pressed in an area distant to the pivotal portion.

9. The microphone as claimed in claim 8, with the opening of the mounting plate including a coupling portion, and with the lid including a hook extending from an inner face thereof and through the opening and engaged with a side of the coupling portion distant to the inner face of the lid.

10. The microphone as claimed in claim 8, with the body including a wire hole adapted to be extended through by a wire electrically connected to the circuit board.

11. The microphone as claimed in claim 9, with the body including an enlarged section inside the casing and having a dimension greater than a diameter of the hole of the casing, and with the resilient portion being a resilient tooth projecting from the enlarged section.

12. The microphone as claimed in claim 8, with the lid including a first sound hole aligned with the audio conversion unit, with the microphone further comprising, in combination: a resilient member mounted between the audio conversion unit and the lid, with the resilient member including a compressible first end having a second sound hole aligned with the audio conversion unit and in communication with the first sound hole, and with the resilient member further including a second end securely mounted around the audio conversion unit.

13. The microphone as claimed in claim 12, with the compressible first end of the resilient member including an annular groove in an outer periphery thereof, with the second sound hole of the resilient member including an inner conic section with increasing diameter toward the audio conversion unit and an outer conic section with decreasing diameter away from the audio conversion unit.

14. The microphone as claimed in claim 13, with the mounting plate including a through-hole in which the audio conversion unit and the second end of the resilient member are received, with the lid including an inner face with a recessed portion surrounding the first sound hole, further comprising an air-permeable dustproof sheet received in the recessed portion and sandwiched between the compressible first end of the resilient member and the lid.

15. The microphone as claimed in claim 1, with the mounting plate including four pegs respectively extending downward from four corners thereof, and with the casing including four holes respectively in four corners thereof for receiving the pegs of the mounting plate.

16. A microphone, comprising:

a casing comprising an open side;

a circuit board mounted in the casing, with an audio conversion unit being mounted on the circuit board, with a switch being mounted on the circuit board and electrically connected to the audio conversion unit such that activation of the switch controls on/off of the audio conversion unit;

a mounting plate securely mounted in the casing and including an end distant to the switch;

a lid mounted to and covering the open side of the casing, with the lid including a pivotal portion pivotably engaged with the end of the mounting plate, allowing another end of the lid to pivot relative to the mounting plate between an activating position for pressing against and activating the switch and a non-activating position disengaged from the switch; and a returning member mounted between the lid and the casing for returning the other end of the lid to the non-activating position.

* * * * *